United States Patent [19]
Ziperovich

[11] Patent Number: 6,025,965
[45] Date of Patent: Feb. 15, 2000

[54] CONTROL LOOPS FOR LOW POWER, HIGH SPEED PRML SAMPLING DATA DETECTION CHANNEL

[75] Inventor: Pablo A. Ziperovich, San Jose, Calif.

[73] Assignee: Quantum Corporation, Milpitas, Calif.

[21] Appl. No.: 09/266,044

[22] Filed: Mar. 10, 1999

Related U.S. Application Data

[62] Division of application No. 08/920,696, Aug. 29, 1997, Pat. No. 5,886,842.

[51] Int. Cl.[7] .................................. G11B 5/09; G11B 5/02
[52] U.S. Cl. .................................. 360/51; 360/46; 360/67
[58] Field of Search .................................. 360/46, 51, 65, 360/67; 375/344, 345

[56] References Cited

U.S. PATENT DOCUMENTS

| | | | |
|---|---|---|---|
| 5,341,249 | 8/1994 | Abbott et al. | 360/46 |
| 5,572,558 | 11/1996 | Behrens | 375/376 |
| 5,583,706 | 12/1996 | Dudley et al. | 360/46 |
| 5,696,639 | 12/1997 | Spurbeck et al. | 360/51 |

*Primary Examiner*—W. Chris Kim
*Attorney, Agent, or Firm*—Michael Zarrabian

[57] ABSTRACT

A power-reduced digital control within a feedback control loop of a sampling data detection channel controls a predetermined operating parameter of the channel in which an analog to digital converter provides digital samples of information in the channel at a predetermined channel clock rate. The digital control comprises a parameter error extraction circuit clocked at the predetermined channel rate which is connected to receive digital samples from the analog to digital converter, and which extracts parameter error values from the digital samples; an averaging circuit for averaging the extracted parameter error values over an integral submultiple of the predetermined channel clock rate; and a parameter error processing circuit which is connected to the parameter error extraction circuit and clocked at the integral submultiple of the predetermined channel rate for generating and putting out digital control values within the feedback control loop for controlling the predetermined operating parameter. The parameter may be timing, gain or DC offset, and the sampling data detection channel may be a PRML channel of a magnetic hard disk drive. A power-reduced control method is also described.

17 Claims, 6 Drawing Sheets

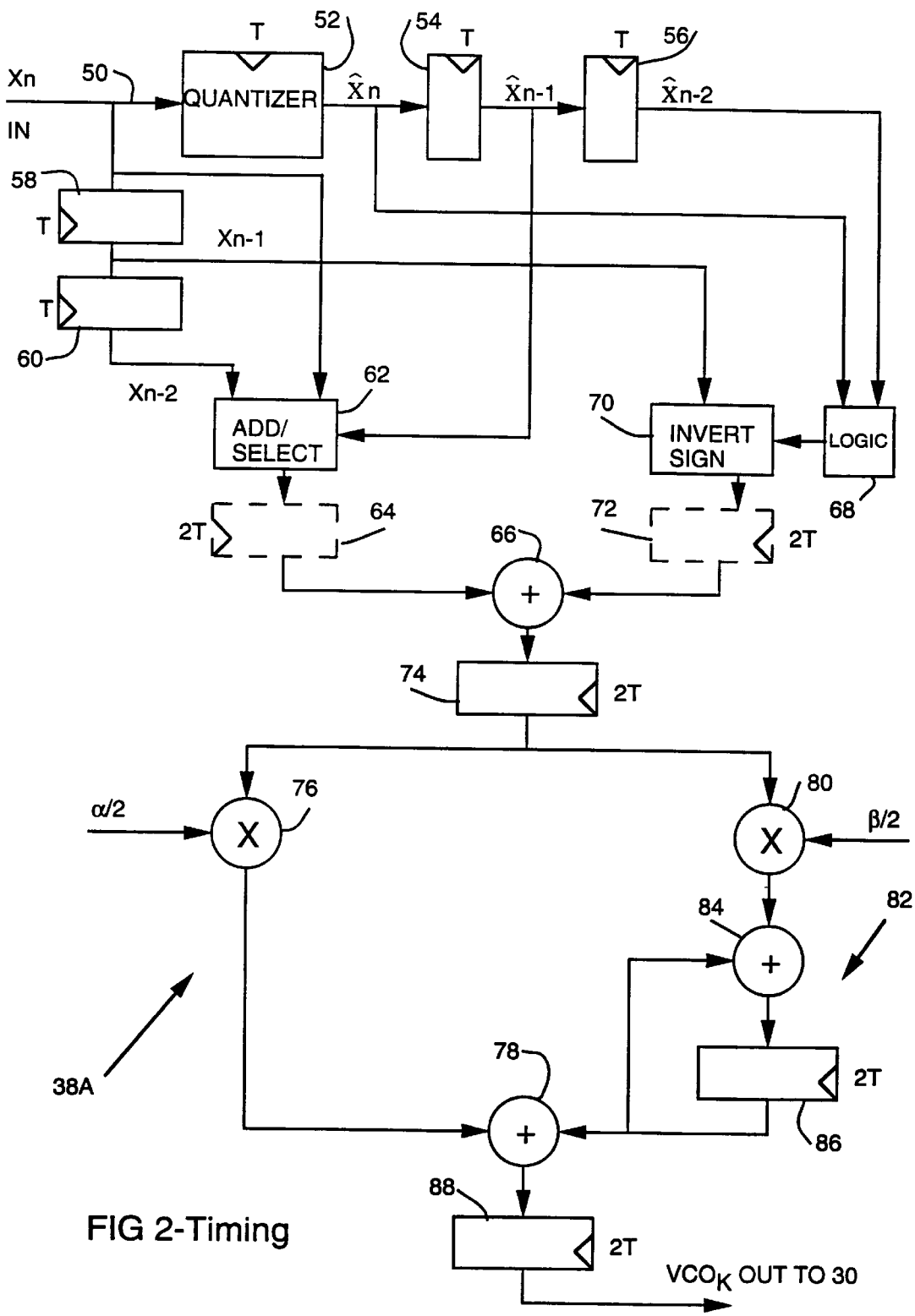
FIG 2-Timing

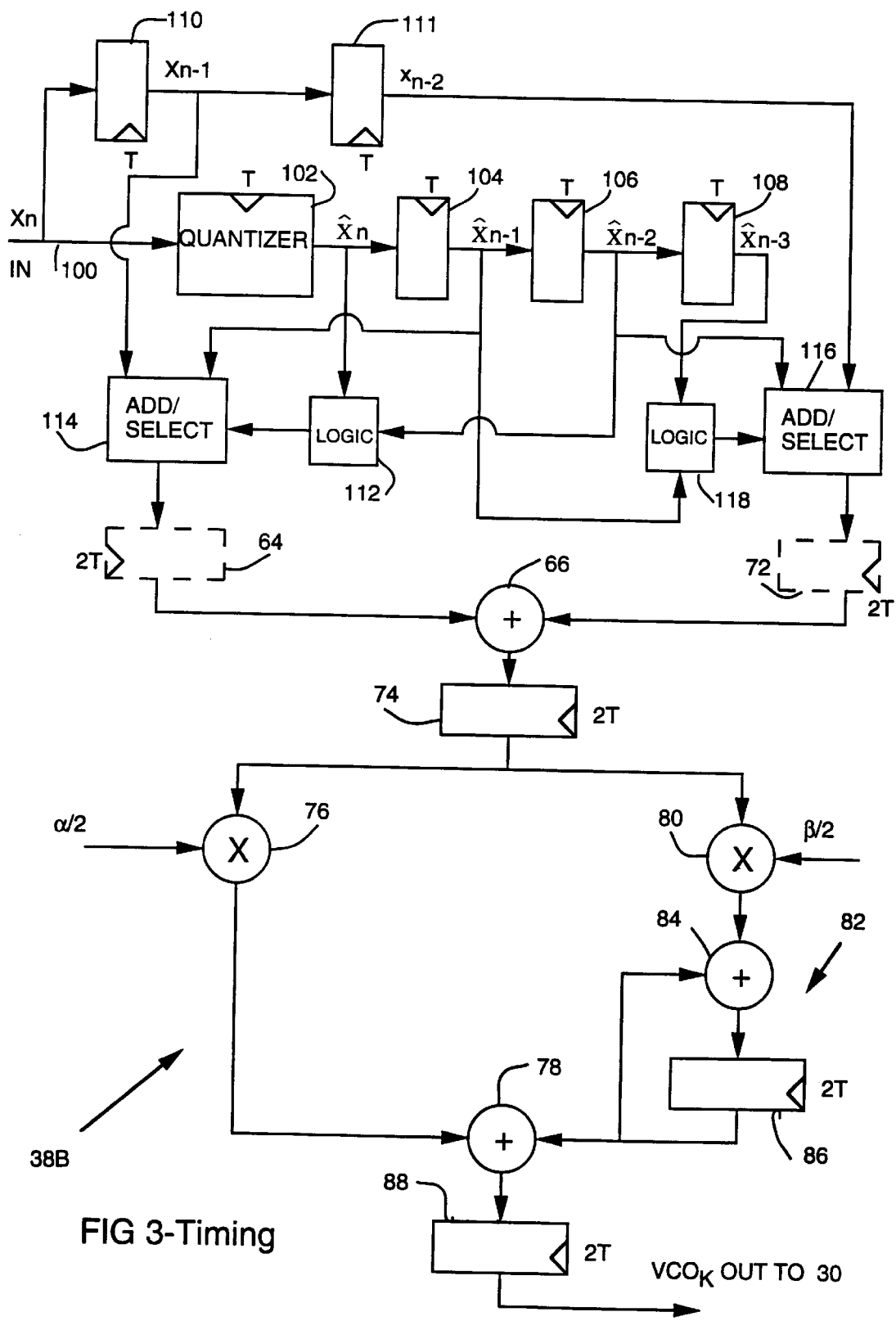
FIG 3-Timing

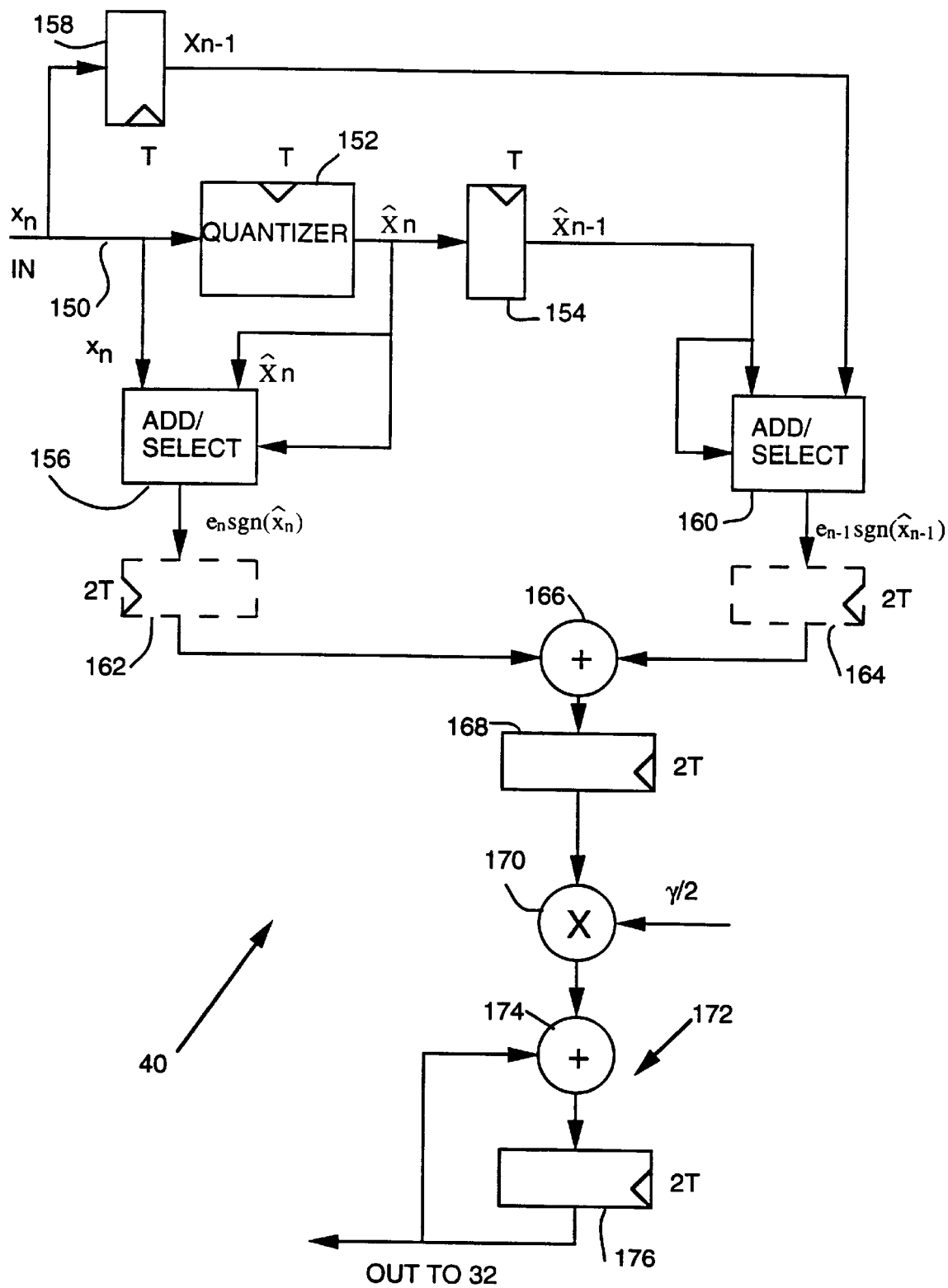
FIG 4- Gain

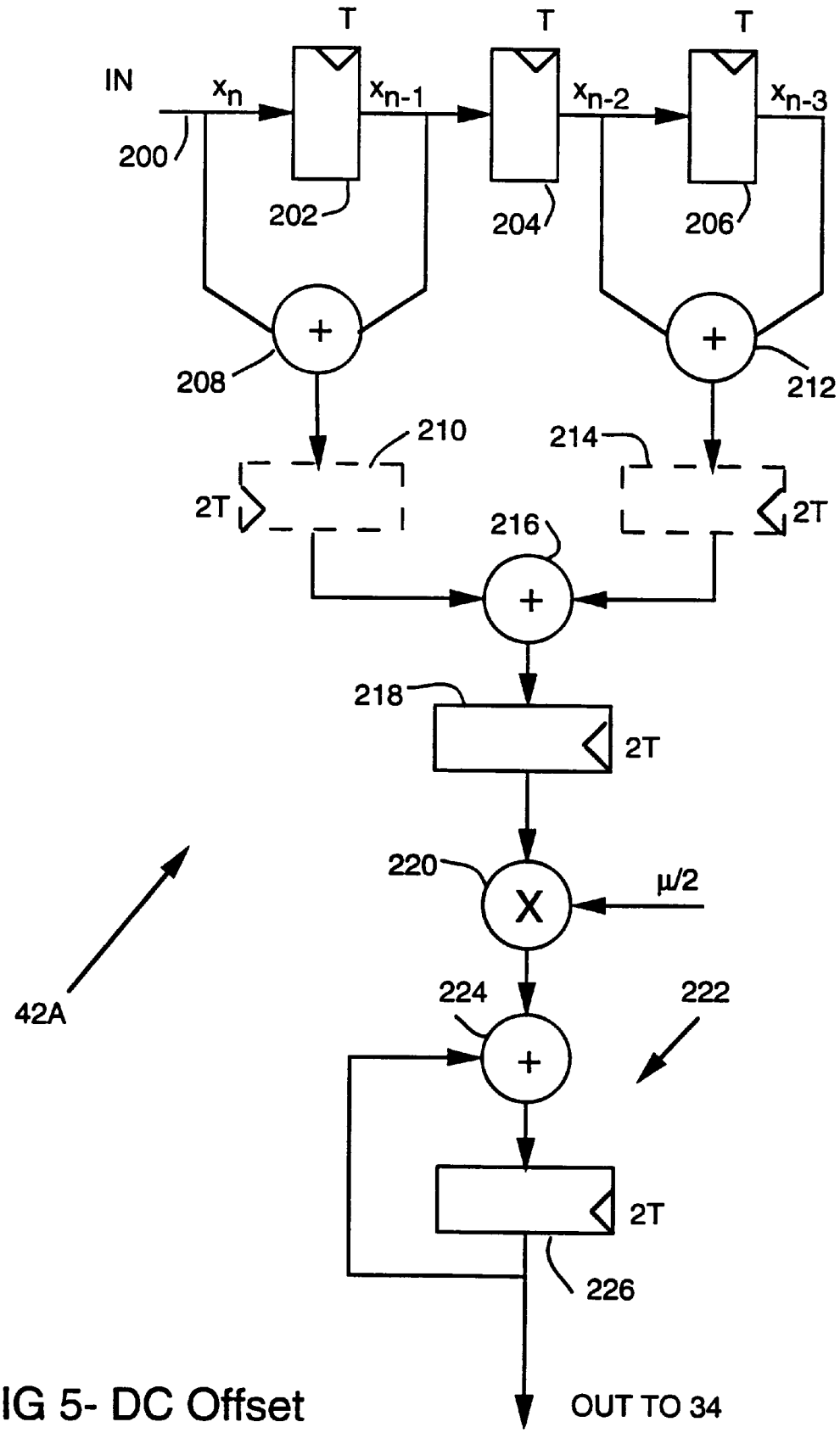
FIG 5- DC Offset

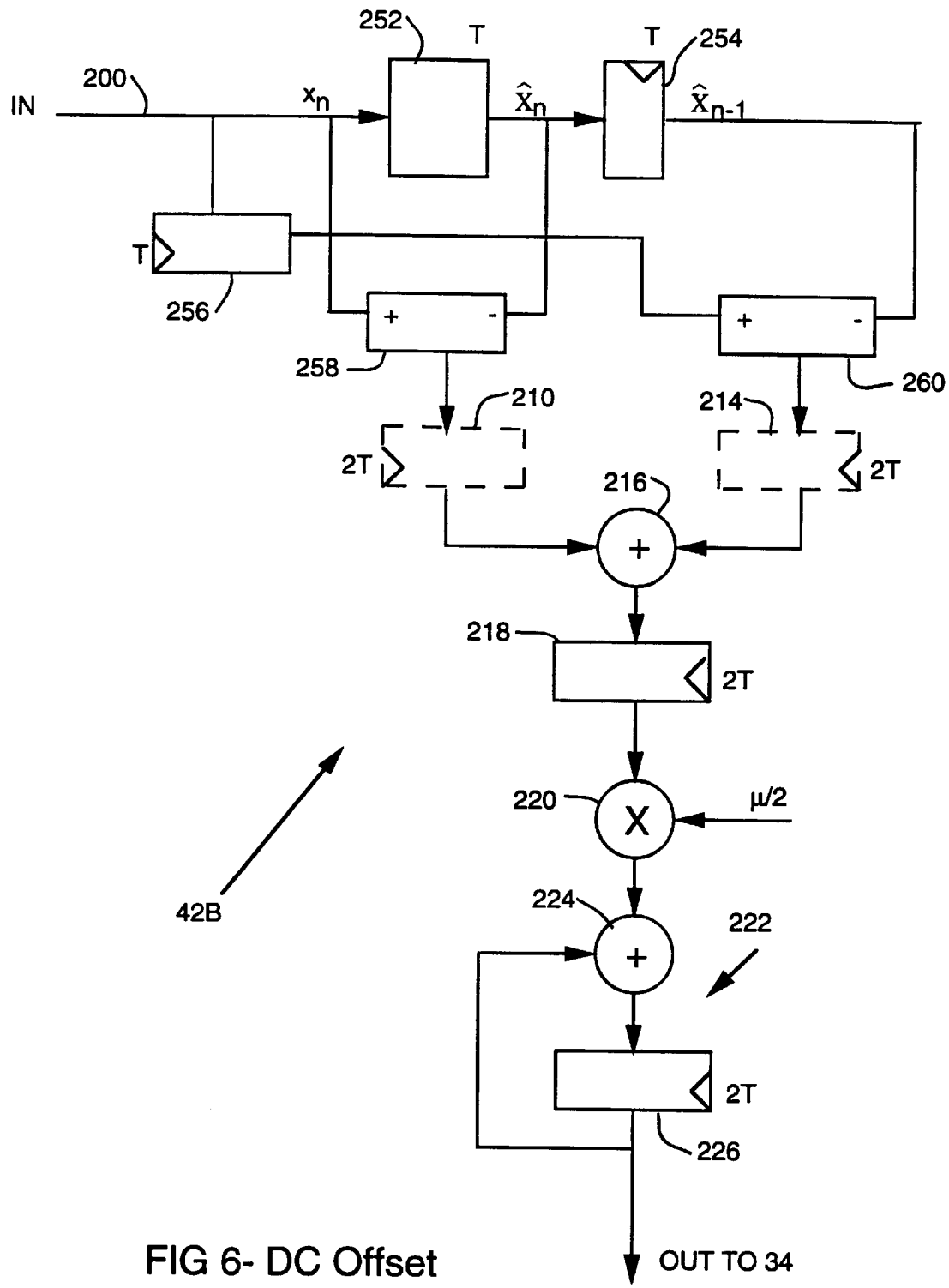
FIG 6- DC Offset

CONTROL LOOPS FOR LOW POWER, HIGH SPEED PRML SAMPLING DATA DETECTION CHANNEL

REFERENCE TO RELATED APPLICATION

This application is a divisional application of co-pending U.S. patent application Ser. No. 08/920,696, filed Aug. 29, 1997.

SUMMARY OF THE INVENTION

The present invention pertains generally to the field of signal processing methods and apparatus for conditioning analog signals representative of digital data received from a transmission medium. More particularly, the present invention pertains to a low power feedback control loop method and apparatus for timing, gain and DC offset control loops within a partial response, maximum likelihood sampled data detection channel.

BACKGROUND OF THE INVENTION

Partial response, maximum likelihood (PRML) recording and playback channels have been implemented within data storage devices, such as hard disk drives. Commonly assigned U.S. Pat. No. 5,341,249 to Abbott, Nguyen and Johnson, entitled: "Disk Drive Using PRML Sampling Data Detection with Digital Adaptive Equalization"; and, the present inventor's commonly assigned, co-pending U.S. patent application Ser. No. 08/276,817 filed on Jul. 10, 1994, entitled: "Real-Time DC Offset Control and Associated Method", now U.S. Pat. No. 5,459,679 provide representative descriptions of the state of the art of partial response, class IV magnetic recording and playback channels. The descriptions thereof are incorporated herein by reference as background.

PRML channels require that the readback signal be correctly equalized, be of a proper amplitude, contain no direct current (DC) offset, and be correctly sampled by an analog to digital converter, in order to realize maximum detector performance. Equalization to a desired spectrum response is typically carried out by analog filtering, or digital finite impulse response (FIR) filtering, or by a combination of analog and digital FIR filtering as was practiced in U.S. Pat. No. 5,341,249 referenced above.

The correct amplitude, DC offset, and sampling time are controlled by digital feedback loops. These loops implement algorithms that compute the amount of amplitude, DC offset and phase error present on the digitized signal samples, and feed back that information either to increase or decrease the amplitude of the signal, its DC content or the required sampling frequency (phase).

The correct amplitude, DC offset, and timing control loops are typically implemented by following known control algorithms. Gain and timing control algorithms are presented in U.S. Pat. No. 5,341,249, and a DC offset control algorithm is presented U.S. patent application Ser. No. 08/276,817, now U.S. Pat. No. 5,459,679 both referenced above.

For example, amplitude error is computed from:

$$\Delta g_n = e_n \text{sgn}(\hat{x}_n)$$

where $e_n = x_n - \hat{x}_n$ is the signal error, xn is the signal sample value, and $\hat{x}_n$ is the expected sample value. The amplitude error is then sent through an integrator function to obtain the required correction to the signal amplitude:

$$G_{n+1} = G_n + \gamma \Delta g_n$$

where $\gamma$ is the gain control loop gain ($\leq 1$) and $G_n$ is the value of the gain loop correction at time n. As the gain loop adapts, the value of the gain error is minimized to a condition when the value of the gain correction stops changing with time. This condition is known as "convergence" (steady state).

When the gain, timing and DC offset control loop equations are implemented in hardware, the values of the respective gain, timing and DC offset errors are updated every clock cycle n, i.e. which is the sampling rate of the particular detection channel. The higher the channel rate, the more power will be consumed by the control loops. One solution is to compute the gain, timing and DC offset error every other cycle, with a resultant loss of one half of the information and a doubled convergence time as consequences. With this approach convergence time can be improved somewhat at the expense of higher loop noise.

A similar approach was proposed in U.S. Pat. No. 5,341, 249 referenced above which called for averaging the timing errors within the timing control loop, and for selecting and putting out every other gain error within the gain control loop. While this approach realized some reduction in power consumption, it is important to note that the timing and gain calculations were carried out at the channel rate, and rate scaling occurred only after the control loop values had already been calculated.

Thus, a hitherto unsolved need has remained for a high speed PRML sampling data detection channel in which the control loops operate effectively at reduced power consumption levels.

SUMMARY OF THE INVENTION WITH OBJECTS

A general object of the present invention is to reduce power consumption within a feedback control loop of a sampling data detection channel by extracting control error parameter information at a channel clock rate and processing the extracted error parameter information at a fraction of the channel clock rate in a manner overcoming limitations and drawbacks of the prior art.

Another object of the present invention is to compute a digital error value for a control loop by averaging two consecutive error terms and by computing the loop update (i.e. correction) every other clock cycle of a sampling data detection channel.

A further object of the present invention is to operate digital control circuits of timing, gain and DC offset control loops of a sampling data detection channel at a fraction of a channel clock rate, thereby reducing the number of registers needed between processing logic blocks of each digital control circuit and thereby reducing implementation circuit size.

One more object of the present invention is to implement plural control circuits for control loops of a sampling data detection channel within a single CMOS application specific integrated circuit and operate the circuitry for processing extracted error parameter information within each loop at an integral submultiple, e.g. ½, of the channel clock rate, thereby to reduce power consumption.

Accordingly, a digital control within a feedback control loop of a sampling data detection channel controls a predetermined operating parameter of the channel in which an analog to digital converter provides digital samples of information in the channel at a predetermined channel clock rate. The digital control comprises a parameter error extraction circuit clocked at the predetermined channel rate which is connected to receive digital samples from the analog to digital converter, and which extracts parameter error values from the digital samples; an averaging circuit for averaging the extracted parameter error values over an integral submultiple of the predetermined channel clock rate; and a parameter error processing circuit which is connected to the parameter error extraction circuit and clocked at the integral submultiple of the predetermined channel rate for generating and putting out digital control values within the feedback control loop for controlling the predetermined operating parameter.

In one aspect of the present invention the parameter error processing circuit includes at least one multiplier (scaler) for multiplying the averaged extracted parameter values by a loop constant, to produce a product, and an integrator for integrating the product.

In another aspect of the present invention the feedback control loop is an nth order control loop and the parameter error processing circuit includes at least n multipliers for multiplying the averaged extracted parameter values by n loop constants, to produce n normalized products, and combining means for combining the n normalized products.

In a further aspect of the present invention, the error extraction circuit comprises a plurality of one-clock period delays at the channel clock rate, the plurality of delays being connected in tandem, and at least two error extraction paths leading from the plurality of delays, and a summing junction for summing error extraction values from the at least two error extraction paths. In this aspect the averaging circuit may be located between at least two error extraction paths and the summing junction; or, the averaging circuit may be located at the output of the summing junction.

In a further aspect of the invention the sampling data detection channel comprises a magnetic recording device and the digital control comprises one of a plurality of digital controls, within timing, gain and DC offset feedback control loops of the sampling data detection within the device channel. In this aspect of the invention the plurality of digital controls are formed on a single application specific integrated circuit CMOS chip.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 2 is a more detailed block diagram of one preferred embodiment of the digital timing control loop within the FIG. 1 detection channel.

FIG. 3 is a more detailed block diagram of another preferred embodiment of the digital timing control loop within the FIG. 1 detection channel.

FIG. 4 is a more detailed block diagram of a preferred embodiment of the digital gain control loop within the FIG. 1 detection channel.

FIG. 5 is a more detailed block diagram of a preferred embodiment of the digital DC offset control loop during acquisition mode within the FIG. 1 detection channel.

FIG. 6 is a more detailed block diagram of a preferred embodiment of the digital DC offset control loop during tracking mode within the FIG. 1 detection channel.

DETAILED DESCRIPTION OF A PREFERRED EMBODIMENT

PRML Read Channel Environment

Figure 1:
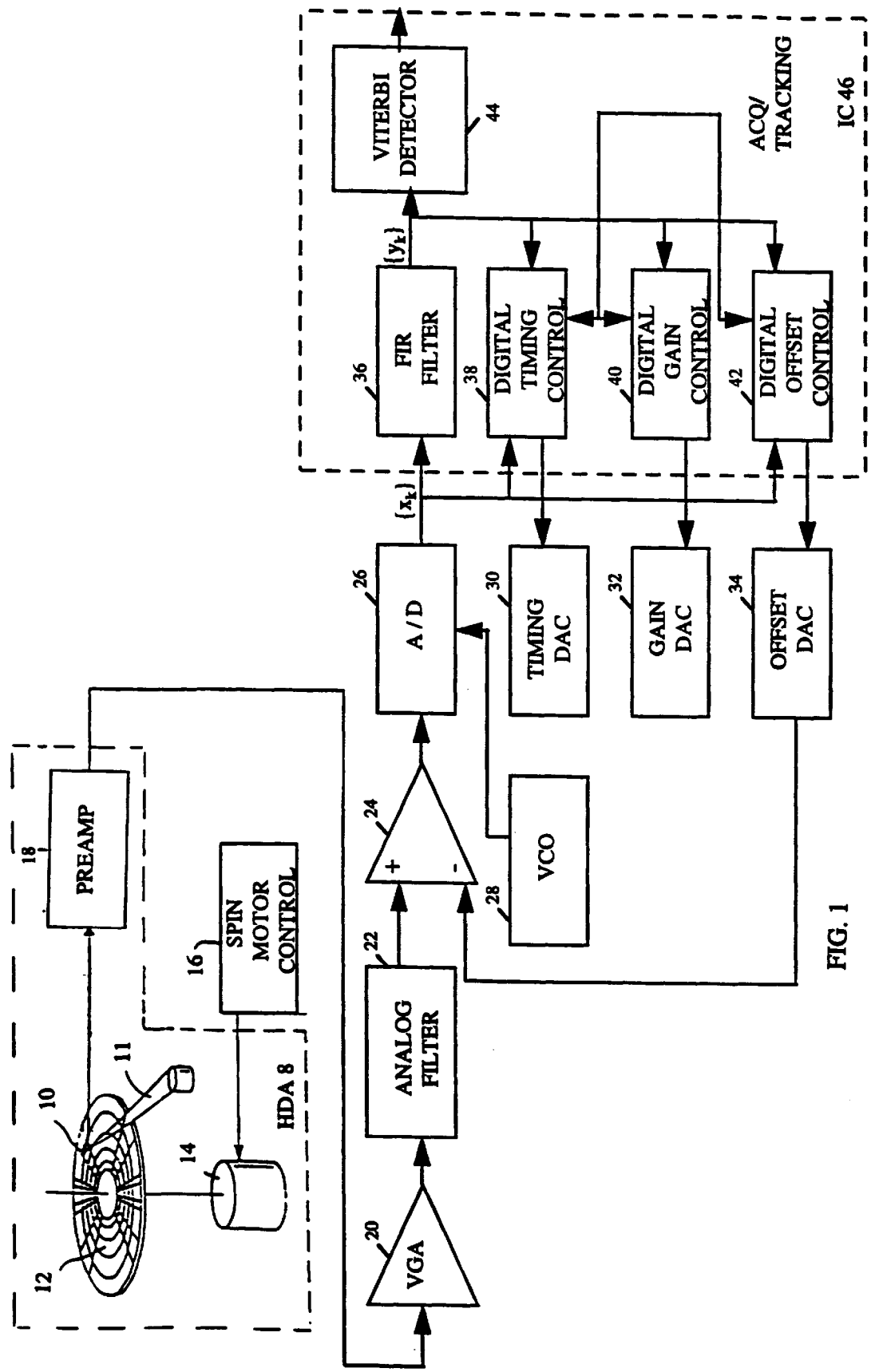
FIG. 1 is a block diagram of a portion of a PRML sampling data detection channel within a hard disk drive illustrating digital timing, gain and DC offset control loops which are operated at reduced power consumption levels in accordance with principles of the present invention.

Referring now to FIG. 1, an exemplary and presently preferred disk drive PRML read channel embodying low power digital timing 38, gain 40, and DC offset 42 control loops in accordance with principles of the present invention is illustrated. While the present invention is described herein in the context of a PRML read channel, it will be apparent to those of skill in the art after reading this specification that the invention is equally applicable to read channels employing traditional peak detection schemes.

In the illustrated disk drive example, a head disk assembly ("HDA") 8 includes at least one data storage disk 12, rotated at a constant angular velocity by a speed regulated spindle motor 14 controlled by a spindle motor control circuit 16. The HDA further includes at least one read/write transducer head 10 positioned in close proximity to a recording surface of the disk 12 by an actuator arm assembly 11; and a preamplifier circuit 18 to provide initial amplification of the analog read back signal from the head 10. During operation, i.e., when the disk 12 is rotating, the head 10 is supported by an air bearing surface in "flying" relationship over the recording surface of the disk 12 as is conventional. The preamplifier circuit 18 is preferably located in close proximity to the head 10 to reduce noise pickup.

The HDA 8 may follow a wide variety of embodiments and sizes. One example of a suitable HDA is described in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Another suitable HDA is described in commonly assigned U.S. Pat. No. 5,243,495. Still another HDA arrangement is described in commonly assigned U.S. Pat. No. 5,396,384. The disclosures of these patents are incorporated by reference herein in their entirety as if fully set forth herein.

During a reading or retrieval process user data and overhead information (previously written or stored as a series of magnetic transitions around a plurality of concentrically spaced recording tracks during a recording process) is "read" from the recording surface of a selected data track of the rotating disk 12 by a head 10. The head 10 "reads" the stored magnetic transitions by generating a small analog output signal representative of the strength and direction of the magnetic flux from the magnetic transition fields impinging on an inductive read element, from the direction of the magnetic flux as directly sensed by a magnetoresistive read element, as the disk 12 is rotated under the head 10.

In a preferred embodiment, before being sent to the read channel the small analog head output signal receives an initial signal boost from the constant gain preamplifier circuit 18. The preamplified analog output from the head (the "read signal") is transmitted to a read channel where it is amplified by a variable gain amplifier ("VGA") 20 and then equalized or filtered by analog filter 22. The filter 22 is preferably a programmable analog filter-equalizer such as the 7th order low pass filter with two programmable opposing zeros added for high frequency boost disclosed in commonly assigned U.S. Pat. No. 5,341,249 referenced above, for example. In the presently preferred zoned recording arrangement illustrated in U.S. Pat. No. 5,341,249, the filter/equalizer 22 is preferably programmed to be optimized for the data transfer rate of the selected radial zone of concentric data tracks from within which the head 10 is reading data.

After undergoing controlled amplification by VGA 20 and analog equalization by filter 22 the read signal passes through a DC offset summing junction 24 and into A/D converter 26. The A/D converter 26 is preferably a six bit resolution "flash" A/D converter of the type disclosed in the referenced '760 patent. The A/D converter 26 samples the incoming analog data stream and quantizes it into raw data samples $\{x_k\}$ according to the number of bits resolved by the particular A/D architecture. The digital quantized raw data samples $\{x_k\}$ are passed through FIR filter 36, where they are transformed into digital conditioned data samples $\{y_k\}$ before being sent to a detector, such as a Viterbi detector 44, for example. Filter 36 is preferably an adaptive digital finite impulse response ("FIR") filter of the type disclosed in the referenced '760 patent.

The raw data samples $x_k$ are supplied to a digital timing control 38, a digital gain control 40, and a digital offset control 42 during control acquisition mode; and, conditioned data samples $y_k$ put out by the FIR filter 36 are supplied e.g. to the digital timing control 38 and digital gain control 40 during tracking mode following acquisition mode.

Referring back to FIG. 1, the operation of the gain and timing loops will now be briefly described As previously discussed, DC offset degrades gain loop acquisition, and alters the read signal envelope at the input of the A/D converter 26.

When read mode is enabled (as signaled by RDGATE asserted true), the gain of the VGA 20 is controlled by a digital gain control loop comprised of digital to analog converter ("DAC") 32, and digital gain control circuit 40. When the disk drive is in non-read mode gain is controlled by an analog gain loop as more fully disclosed in U.S. Pat. No. 5,341,249.

During read mode, the digital gain control circuit looks at conditioned samples $\{y_k\}$ taken from filter 36 and determines appropriate adjustments in signal gain as required. The gain adjustment signal from the control circuit 40 is then sent to gain DAC 32 where it is converted into an analog signal for controlling the gain of VGA 20.

The digital timing control 38 provides a timing error output which is converted into an analog control by a timing digital to analog converter (DAC) to control frequency (phase) of a voltage controlled oscillator (VCO) 28 which in turn clocks the flash A/D 26. The flash A/D 26, digital timing control 38, timing DAC 30 and VCO 28 form a second order phase locked timing loop. When read mode is entered, the timing loop first operates in acquisition mode to rapidly synchronize the A/D converter 26 clock as supplied by VCO 28 to the incoming analog signal stream. During acquisition mode the head 10 supplies a signal read from a preamble field of a track being followed on the disk 12 to A/D converter 26 where it is quantized into sample values $\{x_k\}$. The digital timing control circuit 38 takes preamble sample values $\{x_k\}$ and determines appropriate timing adjustments to be supplied to VCO 28 through timing DAC 30. When tracking mode is entered the digital timing control circuit 38 determines appropriate timing adjustments based on conditioned data samples $\{y_k\}$ from FIR filter 36. The timing adjustment signal from the digital timing control circuit 38 is then converted into an analog signal by timing DAC 30 and supplied to VCO 28 to control clocking within the A/D converter 26.

The digital gain control 40 provides a gain error output which is converted into an analog gain control by a gain DAC 32 and supplied to control the VGA 20. Thus, the VGA 20, analog filter 22, digital offset control 24, flash A/D 26, digital gain control 40, and gain DAC 32 form a first order phase locked gain loop. The amount of gain applied to the incoming read signal by the VGA 20 is controlled by the multi-mode gain loop illustrated in FIG. 1. The gain loop adjusts the amplitude of the analog read signal presented at the input of the A/D converter 26 to fully utilize the dynamic range of the flash A/D converter 26, thus providing enhanced sample resolution.

A DC offset control loop includes the digital offset control 42, an offset DAC 34, and a summing junction 24. The DC offset control loop is a simple first order feedback loop that cancels DC offset during acquisition mode (preamble time) when a read gate control signal is asserted true. After learning an appropriate DC offset correction value during acquisition mode (when the head 10 is following a known data preamble pattern), the DC offset loop is disabled by an internal counter function prior to the end of preamble playback, and the learned correction value is held and applied to summing junction 24 during data read time for a following associated user data segment within the data track being followed by the head 20. Preferably, the DC offset control loop re-learns an appropriate correction value prior to the reading of each user data segment providing periodic compensation for dynamic changes in DC offset occurring during disk drive operations. At the end of a read operation when the read gate control signal switches states to false, the held correction value may be cleared or reset to some predetermined initial condition thereby readying the DC offset control loop for the next time read mode is entered. In an equally preferred alternative embodiment, each time a user data segment is to be read and acquisition mode is entered the held correction value may be cleared (or reset to some predetermined initial condition), and the DC offset control loop re-enabled at the same time to learn an appropriate DC offset correction value for the next segment of user data. Having provided this summary background of an operating environment, principles of the present invention will be discussed in connection with more detailed diagrams of the digital timing control 38, digital gain control 40 and digital DC offset control 42, which now follow.

Power-Reduced Timing Control

A first example of a power-reduced digital timing control 38A is depicted in FIG. 2. This control 38A generates a timing error control $VCO_k$ in accordance with the following relations:

$$\Delta_{pn}=((x_{n-2}-x_n)x_{n-1}+x_{n-1}(\hat{x}_n-\hat{x}_{n-2})) \quad (1)$$

$$VCO_{k+1}=T_k+\alpha/2\Delta_{pk},\ T_{k+1}=T_k+\beta/2\Delta_{pk} \quad (2)$$

where k=2n. These relations illustrate averaging of timing error between two consecutive samples, thus not losing timing information taken from the channel. Every other averaged error is then applied as an input to an integrator which also runs at one half the channel rate.

Thus, as shown in FIG. 2, a first implementation of the digital timing control 38A has an input path 50 which receives either raw data samples xn directly from the flash A/D 26 during acquisition mode, or conditioned samples yn from the output of the FIR filter 36 during tracking mode. These samples are then applied to a quantizer 52 which functions as a two-level quantizer during acquisition mode (when nominal samples from the preamble are e.g. +1, +1, −1, −1, +1, +1, −1, −1, etc.). During tracking mode, the quantizer 52 has three quantization levels, +1, 0 and −1. The quantizer 52 applies thresholds to incoming digital samples, and thus puts out two-level or three-level estimates (denominated $\hat{x}_n$ in FIG. 2) of the incoming samples.

A first delay 54 imposes a one clock period T delay and puts out the estimates $\hat{x}_{n-1}$. A second one-T delay register 56 puts out the estimates $\hat{x}_{n-2}$. The incoming samples are also delayed by passage through a first one-T delay 58 which results in one clock cycle delayed samples $\hat{x}_{n-1}$, and a second one T delay 60 which puts out two clock cycle delayed samples $x_{n-2}$ to an add/select circuit 62, which in this example operates at the channel clock rate. Another input to the add/select circuit 62 is provided from the input 50. The $\hat{x}_{n-1}$ estimate output from the delay 54 is applied to control a select function of the add/select circuit 62. An output from the add/select circuit 62 provides the first nested term of the equation (1) above, i.e. $(x_{n-2}-x_n)\hat{x}n-1$.

The estimates $\hat{x}_n$ from the quantizer 52, and $\hat{x}_{n-2}$ from the delay 56 are applied to a logic circuit 68 which supplies an output to a sign inversion circuit 70, controlled by the delayed sample $\hat{x}n-1$ from the delay 58. A resultant output from the sign inversion circuit 70 supplies the second nested term of equation (1) above, i.e. $x_{n-1}(\hat{x}_n-\hat{x}_{n-2})$. The logic circuit 68 and the sign inversion circuit 70 operate at the full channel rate in this example.

The averaging function may occur at the outputs of the add/select circuit 62 and sign inversion circuit 70, as with registers 64 and 72 which are clocked at 2T or k rate. The summing of the nested terms within equation (1) is then carried out by a summing circuit 66, also operating at one half the channel rate.

Alternatively, and depending upon channel throughput rates and circuit design choices, a register 74 may be provided at the output of the summing circuit 66. In this alternative implementation, the registers 64 and 72 are omitted, and the summing circuit 66 operates at the full channel rate, and the combined terms are stored in the register 74 which is clocked at one half (2T) the channel rate.

Thereafter, the equation (1) output is multiplied by alpha/2 in a multiplier 76 with the product being applied to a summing circuit 78. At the same time the equation (1) output is multiplied by beta/2 in a multiplier 80, and the product is applied to an integrator 82. The integrator includes a recursive loop comprising a summing circuit 84 and a 2T delay register 86. An output from the delay register 86 is fed back to the summing circuit 84 and is also fed forward to the summing circuit 78. A resultant sum from the summing circuit, equation (2) above, is put out from a register 88, also clocked at the 2T, one half channel rate. Thus, in this example, it is seen that at least the multiplication circuits 76 and 80, and the integrator 82 are clocked at one half the channel rate, thereby reducing power consumption. Depending upon implementation and the level of any pipelining delays, the summing circuit 66 may also be made to operate at one half the channel rate.

Another example of a digital timing control circuit 38B is provided in FIG. 3. This circuit implements the following equations:

$$\Delta_{pn} = e_{n-1}(\hat{x}_n - \hat{x}_{n-2}) + e_{n-2}(\hat{x}_{n-1} - \hat{x}_{n-3}). \tag{3}$$

In this example of FIG. 3 a two-three level quantizer 102 is followed by three one-T delay registers 104, 106 and 108, thereby providing four estimates $\hat{x}_n$, $\hat{x}_{n-1}$, $\hat{x}_{n-2}$, and $\hat{x}_{n-3}$. Estimates $\hat{x}_n$ and $\hat{x}_{n-2}$ are applied to a logic circuit 112 which feeds into and controls an add/select circuit 114. The circuit effectively multiplies the difference by the term $x_{n-1}$ received from the register 110, to provide the first nested term of equation (3) above, i.e. $e_{n-1}(\hat{x}_n-\hat{x}_{n-2})$. Similarly, estimates $\hat{x}_{n-1}$ and $\hat{x}_{n-3}$ are applied to a logic circuit 118 which feeds into and controls an add/select circuit 116. A one-T delay circuit 111 provides a term $x_{n-2}$ which is also applied as a multiplier to the add/select circuit 116, to provide the second nested term of equation (3) above, i.e. $e_{n-2}(\hat{x}_{n-1}-\hat{x}_{n-3})$. The add/select circuit 114 may be followed by the averaging latch 64, and the add/select circuit 116 may be followed by the register 72; or, the summing circuit 66 may be operated at the full channel rate and followed by the alternative register 74, as previously explained in connection with the FIG. 2 example discussed above. The rest of the FIG. 3 circuit is essentially the same as the FIG. 2 circuit and implements equation (2) above, and the description of elements of FIG. 2 bearing the same reference numerals as FIG. 3 applies with the same measure to the FIG. 3 example.

Power-Reduced Gain Control

FIG. 4 provides an example of the power-reduced digital gain control 40 in accordance with principles of the present invention. This example 40 implements the following gain loop control equations which apply during gain tracking mode:

$$\Delta g_n = e_n \text{sgn}(\hat{x}_n) + e_{n-1} \text{sgn}(\hat{x}_{n-1}) \tag{4}$$

$$e_n = x_n - \hat{x}_n \tag{5}$$

$$\text{sgn}(\hat{x}_n) = \begin{cases} +1 & \text{if } x_n > \text{threshold}_{pos} \\ 0 & \text{if threshold}_{neg} < x_n < \text{threshold}_{pos} \\ -1 & \text{if } x_n < \text{threshold}_{neg} \end{cases} \tag{6}$$

$$Vga_{k+1} = Vga_k + \gamma/2\Delta gk, \text{ where } K = 2n. \tag{7}$$

During gain acquisition mode when a sector preamble pattern is being sampled, the gain acquisition equations are as described in commonly assigned U.S. Pat. No. 5,341,249 referenced above.

Referring now to FIG. 4, samples $e_n$ on an input path 150 are applied to a three-level quantizer 152 which establishes the thresholdpos and thresholdneg levels of equation (6). An output of the quantizer 152 provides a sample estimate $\hat{x}_n$ and an output of a following one-T delay 154 provides a delayed sample estimate $\hat{x}_{n-1}$. An add/select circuit 156 implements and provides the first nested term of equation (4), i.e. $e_n \text{sgn}(\hat{x}_n)$. Another one-T delay 158 delays the incoming samples, en and provides the delayed samples $x_{n-1}$ to another add/select circuit 160 which also receives delayed estimates $\hat{x}_n^{-1}$ from the delay 154, and implements and provides the second nested term of equation (4), i.e. $e_{n-1}\text{sgn}(\hat{x}_{n-1})$.

Those skilled in the art will appreciate that each of the add/select circuits 156 and 160 may be replaced by a summing circuit followed by a multiplier. Thus, the add/select circuit 156 may be replaced by a summing circuit which sums the sample $x_n$ and the estimate $\hat{x}_n$ and a multiplier which multiplies the resultant sum by the sign (plus or minus) of the estimate $\hat{x}_n$, or zero.

As shown in FIG. 4, the nested terms of equation (4) are combined by first passing through registers 162 and 164 which are clocked at one half (2T) the channel clock rate, then reaching a summing circuit 166. Alternatively, the summing circuit 166 may be clocked at the channel rate and be followed by a register 168 which stores the nested terms of equation (4). Either way, the following circuitry which implements equation (7) above, is clocked at one-half the channel rate and therefore manifests reduced power consumption. A multiplier circuit 170 multiplies the equation (4) output by γ/2, and an integrator function 172 comprising an adder circuit 174 and a two-T delay register 176 connected in a feedback arrangement as shown in FIG. 4 implements and provides the equation (7) gain error output which is supplied to the gain DAC 32.

It should be appreciated by those skilled in the art that the same samples $e_n$ are employed in the timing control example 38B of FIG. 3 as well as the gain control circuit 40 of FIG. 4, leading to further overall circuit simplification and reduced power consumption.

Power-Reduced DC Offset Control

Turning now to FIG. 5, an example of a power-reduced DC offset control 42A is presented. This control 42A preferably operates upon preamble data during acquisition mode in accordance with the following equations:

$$\Delta O_n = (x_n + x_{n-2} + x_{n-1} + x_{n-3}) \quad (8)$$

$$\text{Offset}_{k+1} = \text{Offset}_k + \mu/2\Delta O_n, \quad (9)$$

where k=2n.

In the FIG. 5 example quantized samples $x_n$ on an input path 200 are passed through three one-T delays 202, 204, and 206, which respectively yield delayed samples $x_{n-1}$, $x_{n-2}$ and $x_{n-3}$. Samples $x_n$ and $x_{n-1}$ are summed in a summing node 208 and a resultant sum is held in e.g. in a register 210 clocked at the one-half channel rate k or 2T clocking rate. Similarly, samples $x_{n-2}$ and $x_{n-3}$ are summed in a summing node 212 and held in a register 214 which may also be clocked at one-half the channel rate. The held values are then combined in an adder 216 operating at one-half the channel rate. Alternatively, the registers 210 and 214 may be omitted, the adder 216 operated at the channel rate and a register 218 may be provided at the output of the adder 216 which is clocked at one half the channel rate. In any event, whether averaging of the main term of equation (8) occurs at the registers 210 and 214, or at the register 218, equation (8) is implemented at the output of the register 218 (or output of the adder 216 when registers 210 and 214 are used). The equation (8) result is then multiplied by an offset factor μ/2 in a multiplier 220. An integrator 222, comprising an adder 224 and a register 226 clocked at one-half the channel rate in a recursive feedback connection, then implements equation (9). The output $\text{Offset}_k$ is then provided to the offset DAC 34.

During tracking mode, a DC offset circuit 42B operates during tracking mode in accordance with the relations:

$$\Delta O_n = e_n + e_{n-1} = x_n - \hat{x}_n + x_{n-1} - \hat{x}_{n-1} \quad (10)$$

$$\text{Offset}_{k+1} = \text{Offset}_k + \frac{\mu}{2}\Delta O_k, k = 2\mu \quad (11)$$

In accordance with principles of the present invention, these equations are implemented by the circuit 42B shown in FIG. 6. Therein, the input signal on the path 200 enters a quantizer 252 which produces sample estimates. The sample estimates $\hat{x}_n$ are differenced with samples $x_n$ in a subtractor circuit 258 to produce a first difference. The sample estimates $\hat{x}_n$ from the quantizer 252 are also delayed by a delay register 254 to produce delayed estimates $\hat{x}_{n-1}$. At the same time incoming samples $x_n$ are delayed by a register 256 to produce delayed samples $x_{n-1}$. The delayed estimates $\hat{x}_{n-1}$ are then differenced from the delayed samples xn-1 in a subtractor circuit 260 to produce a second difference. The first and second difference values may then be passed through delay registers 210 and 214 clocked at one-half the sample rate, and then summmed in a summing circuit 216, or the first and second difference values may be summed directly in the summing circuit 216 at the sample rate to yield equation (10) above, and then passed through a delay register 218 clocked at the one-half sample rate, as previously explained above. The remainder of the DC offset circuit 42B implements equation (11) and is identical with the circuit shown in FIG. 5. The description of the common elements bearing like reference numbers and previously described will not be repeated.

In practice, the power-reduced timing control 38, the power-reduced gain control 40, and the power-reduced DC offset control 42 are formed as portions of a single very large scale integrated circuit chip 46 also including e.g. the FIR filter 36 and the Viterbi detector 44 as shown within the dashed block drawn in FIG. 1. Typically, the integrated circuit chip 46 is an application-specific integrated circuit (ASIC) which employs complementary metal-oxide-semiconductor (CMOS) circuit elements. Since these elements draw current only when switching from state-to state, operating current is a direct function of the channel clock speed. By operating the timing control 36, the gain control 40, and the DC offset control at an integral submultiple, e.g. ½, the channel clock rate, considerable power savings are realized over the prior approach, as illustrated in the referenced U.S. Pat. No. 5,341,249, discussed above.

It should be apparent to those skilled in the art that if registers 64 and 72 in FIGS. 2 and 3 are implemented, register 74 need not be provided. Similarly, if registers 162 and 164 are implemented in the FIG. 4 gain control loop, register 168 would not be needed. Finally, if registers 210 and 214 are implemented in the FIGS. 5 and 6 DC offset control loop examples, register 218 would not be needed. As explained above, the choice between two registers upstream of a summing junction, or one register downstream of the summing junction 15 based on optimization of channel throughput rates and related circuit design choices.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A digital control within a feedback control loop of a sampling data detection channel for controlling a predetermined operating parameter of the channel in which an analog to digital converter provides digital samples of information in the channel at a predetermined channel clock rate, the digital control comprising:

a parameter error extraction circuit clocked at the predetermined channel rate and connected to receive digital samples from the analog to digital converter, for extracting parameter error values from the digital samples, an averaging circuit for averaging the extracted parameter error values over an integral submultiple of the predetermined channel rate, and a parameter error processing circuit connected to the parameter error extraction circuit and clocked at the integral submultiple of the predetermined channel rate for generating and putting out digital control values within the feedback control loop for controlling the predetermined operating parameter, the parameter error processing circuit includes at least one multiplier for multiplying the averaged extracted parameter values by a loop constant, to produce a product, and an integrator for integrating the product.

2. The digital control within a feedback control loop set forth in claim 1 wherein the feedback control loop is an nth order control loop, wherein n comprises an interger greater than zero, and wherein the parameter error processing circuit includes at least n multipliers for multiplying the averaged extracted parameter values by n loop constants, to produce n normalized products, and combining means for combining the n normalized products.

3. The digital control within a feedback control loop set forth in claim 1 wherein the feedback control loop controls clock frequency and phase of the analog to digital converter.

4. The digital control within a feedback control loop set forth in claim 1 wherein the sampling data detection channel includes a variable gain amplifier and wherein the feedback control loop controls gain of the variable gain amplifier.

5. The digital control within a feedback control loop set forth in claim 1 wherein the sampling data detection channel includes a DC offset summing junction and wherein the feedback control loop controls the DC offset summing junction.

6. The digital control within a feedback control loop set forth in claim 1 wherein the digital control comprises one of a plurality of digital controls within timing, gain and DC offset feedback control loops of the sampling data detection channel included in a magnetic recording device.

7. A method for reducing power consumption within a feedback control loop of a sampling data detection channel including generating a digital control for controlling a predetermined operating parameter of the channel in which an analog to digital converter provides digital samples of information in the channel at a predetermined channel clock rate, the method comprising the steps of:

extracting parameter error values at the predetermined channel rate from the digital samples within a parameter error extraction circuit connected to receive digital samples from the analog to digital converter, averaging the extracted parameter error values within an averaging circuit over an integral submultiple of the predetermined channel rate, generating and putting out digital control values at the integral submultiple of the predetermined channel rate from a parameter error processing circuit for controlling the predetermined operating parameter within the feedback control loop and multiplying the averaged extracted parameter values by a loop constant to produce a product, and integrating the product.

8. The control method set forth in claim 7 wherein the feedback control loop is an nth order control loop, wherein n comprises an integer greater than zero, and the step of generating and putting out digital control values at the integral submultiple of the predetermined channel rate comprises the steps of multiplying the averaged extracted parameter values by n loop constants within at least n multipliers for producing n normalized products, and combining the n normalized products within combining means to generate the digital control values.

9. The control method set forth in claim 7 for generating a timing control ($VCO_k$) for controlling sampling frequency and phase of the analog to digital converter.

10. The control method set forth in claim 9 wherein the timing control ($VCO_k$) is generated in accordance with:

$$VCO_{k+1}=T_k+\alpha/2\Delta_{\rho k}, T_{k+1}=T_k+\beta/2\Delta_{\rho k},$$

where n represents a current digital sample, where $\hat{x}_n$ represents a current sample estimate, where k=2n, where $\Delta\rho n=((x_{n-2}-x_n)\hat{x}n-1+x_{n-1}(\hat{x}_n-\hat{x}_{n-2}))$ (wherein $\alpha$ and $\beta$ represent timing control loop scaling functions), and where $\Delta\rho_n$ represents an average timing phase error.

11. The control method set forth in claim 9, wherein the timing control ($VCO_k$) is generated in accordance with:

$$VCO_{k+1}=T_k+\alpha/2\Delta_{\rho k}, T_{k+1}=T_k+\beta/2\Delta_{\rho k},$$

where n represents a current digital sample, where $\hat{x}_n$ represents a current sample estimate, where k=2n, where $\Delta\rho n=e_{n-1}(\hat{x}_n-\hat{x}_{n-2})+e_{n-2}(\hat{x}_{n-1}-\hat{x}_{n-3})$(wherein $\alpha$ and $\beta$ represent timing control loop scaling functions), and where $\Delta\rho_n$ represents an average timing phase error.

12. The control method set forth in claim 7 wherein the sampling data detection channel includes a variable gain amplifier and wherein the control method generates a gain control ($V_g\Delta_k$) for controlling gain of a variable gain amplifier within the channel.

13. The control method set forth in claim 12 wherein the gain control (Vgak) is generated during at least a gain acquisition mode in accordance with:

$$Vga_{k+1}=Vga_k+\gamma/2\Delta_{gk},$$

where $\Delta g_n=e_n\,\mathrm{sgn}(\hat{x}_n)+e_{n-1}\,\mathrm{sgn}(\hat{x}_{n-1})$=average gain error, where n denotes a current digital sample, where $\hat{x}_n$ represents a current sample estimate, where k=2n, en=xn-$\hat{x}_n$, and where $$\mathrm{sgn}(\hat{x}_n)=\begin{cases}+1 & \text{if } x_n>\text{threshold}_{pos}\\ 0 & \text{if threshold}_{neg}<x_n<\text{threshold}_{pos}\\ -1 & \text{if } x_n<\text{threshold}_{neg}.\end{cases}$$

14. The control method set forth in claim 7 wherein the sampling data detection channel includes a DC offset summing junction and wherein the control method generates a DC offset control ($\text{Offset}_k$) for controlling the DC offset summing junction.

15. The control method set forth in claim 14 wherein the DC offset control ($\text{Offset}_k$) is generated in accordance with:

$\text{Offset}_{k+1}=\text{Offset}_k+\mu/2\Delta O_k$, where n denotes a current digital sample, where $\mu$ represents a DC offset control loop scaling factor, where $\Delta O_n=(x_n+x_{n-2}+x_{n-1}+x_{n-3})$=a current averaged DC offset error, and where k=2n.

16. The control method set forth in claim 14 wherein the DC offset control (Offsetk) is generated in accordance with:

$\text{Offset}_{k+1}=\text{Offset}_k+\mu/2\Delta O_n$, where n denotes a current digital sample, where $\mu$ represents a DC offset control loop scaling factor, where $\Delta O_n=e_n+e_{n-1}=x_n-\hat{x}_n+x_{n-1}-\hat{x}_{n-1}$=a current averaged DC offset error, and where $\hat{x}_n$ denotes a current sample estimate.

17. The control method set forth in claim 7 wherein the method is for controlling one of a plurality of digital controls within timing, gain and DC offset feedback control loops of the sampling data detection channel included in a magnetic recording device.

\* \* \* \* \*